(12) United States Patent
Han

(10) Patent No.: US 12,289,541 B2
(45) Date of Patent: Apr. 29, 2025

(54) IMAGE PROCESSOR AND IMAGE PROCESSING SYSTEM INCLUDING THE SAME

(71) Applicant: SK hynix Inc., Gyeonggi-do (KR)

(72) Inventor: Ji Hee Han, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 309 days.

(21) Appl. No.: 18/089,571

(22) Filed: Dec. 28, 2022

(65) Prior Publication Data

US 2023/0345139 A1    Oct. 26, 2023

(30) Foreign Application Priority Data

Apr. 20, 2022    (KR) .................. 10-2022-0048789

(51) Int. Cl.
*H04N 25/11* (2023.01)
*H04N 25/40* (2023.01)

(52) U.S. Cl.
CPC ............. *H04N 25/11* (2023.01); *H04N 25/41* (2023.01)

(58) Field of Classification Search
CPC ........ H04N 25/11; H04N 25/41; H04N 25/68; H04N 25/704; H04N 25/441; H04N 25/447; H04N 23/80; H04N 25/134
USPC .................................................. 348/207.99
See application file for complete search history.

(56) References Cited

U.S. PATENT DOCUMENTS

| 9,338,380 | B2 * | 5/2016 | Mlinar | H04N 25/134 |
| 9,860,438 | B2 | 1/2018 | Nakata | |
| 10,958,824 | B2 * | 3/2021 | Tanaka | H04N 25/674 |
| 2013/0002936 | A1 * | 1/2013 | Hirama | H04N 25/702 348/349 |
| 2016/0234428 | A1 * | 8/2016 | Okazawa | H04N 25/134 |
| 2016/0353005 | A1 * | 12/2016 | Kaibara | H04N 25/778 |
| 2019/0281226 | A1 * | 9/2019 | Wang | H01L 27/14605 |
| 2019/0335110 | A1 * | 10/2019 | Kobayashi | H04N 25/134 |

* cited by examiner

*Primary Examiner* — Lin Ye
*Assistant Examiner* — Chan T Nguyen
(74) *Attorney, Agent, or Firm* — IP & T GROUP LLP

(57) ABSTRACT

Disclosed is an image processor and an image processing system including the same, and the image processor includes: a first processing module for generating an actual output image obtained by correcting first values of first phase detection pixels based on an actual input image corresponding to first normal pixels and the first phase detection pixels arranged in a first pattern; a second processing module for calculating inverse gain values between the actual input image and the actual output image; and a third processing module for generating a virtual input image based on the actual output image and the inverse gain values, the virtual input image corresponding to second normal pixels and second phase detection pixels arranged in a second pattern, wherein the first processing module further generates a virtual output image obtained by correcting second values of the second phase detection pixels on the basis of the virtual input image.

20 Claims, 8 Drawing Sheets

| G | G | R | R | G | G | R | R | G | G | R | R | G | G | R | R |
|---|---|---|---|---|---|---|---|---|---|---|---|---|---|---|---|
| G | G | R | R | G | G | R | R | G | G | R | R | G | G | R | R |
| B | B | G | G | B | B | G | G | B | B | G | G | B | B | G | G |
| B | LP | RP | G | B | B | G | G | B | B | G | G | B | B | G | G |
| G | G | R | R | G | G | R | R | G | G | R | R | G | G | R | R |
| G | G | R | R | G | G | R | R | G | G | R | R | G | G | R | R |
| B | B | G | G | B | B | G | G | B | B | G | G | B | B | G | G |
| B | B | G | G | B | B | G | G | B | B | G | G | B | B | G | G |
| G | G | R | R | G | G | R | R | G | G | R | R | G | G | R | R |
| G | G | R | R | G | G | R | R | G | G | R | R | G | G | R | R |
| B | B | G | G | B | B | G | G | B | B | G | G | B | B | G | G |
| B | B | G | G | B | B | G | G | B | LP | RP | G | B | B | G | G |
| G | G | R | R | G | G | R | R | G | G | R | R | G | G | R | R |
| G | G | R | R | G | G | R | R | G | G | R | R | G | G | R | R |
| B | B | G | G | B | B | G | G | B | B | G | G | B | B | G | G |
| B | B | G | G | B | B | G | G | B | B | G | G | B | B | G | G |

FIG. 10

IMAGE PROCESSOR AND IMAGE PROCESSING SYSTEM INCLUDING THE SAME

CROSS-REFERENCE TO RELATED APPLICATION(S)

This application claims priority under 35 U.S.C. § 119 to Korean Patent Application No. 10-2022-0048789, filed on Apr. 20, 2022, the disclosure of which is incorporated herein by reference in its entirety.

BACKGROUND

1. Field

Various embodiments of the present disclosure relate to a semiconductor design technique, and more particularly, to an image processor for processing an image generated from an image sensor, and an image processing system including the image processor.

2. Description of the Related Art

Image sensors are devices for capturing images using the property of a semiconductor which reacts to light. Image sensors may be roughly classified into charge-coupled device (CCD) image sensors and complementary metal-oxide semiconductor (CMOS) image sensors. Recently, CMOS image sensors are widely used because the CMOS image sensors can allow both analog and digital control circuits to be directly implemented on a single integrated circuit (IC).

Each of the image sensors may support an auto-focus function. The image sensor may include phase detection pixels for phase detection to support the auto-focus function. In a pixel array included in the image sensor, the phase detection pixels may be arranged sparsely. The phase detection pixels may be arranged in various ways according to aspects of a color filter array, a micro-lens, and the like.

SUMMARY

Various embodiments of the present disclosure are directed to an image processor capable of verifying an image signal processing (ISP) algorithm in advance on the basis of a virtual input image when patterns, i.e., positions and/or densities, of phase detection pixels is changed, and an image processing system including the image processor.

In accordance with an embodiment of the present disclosure, an image processor may include: a first processing module suitable for generating an actual output image obtained by correcting first phase detection pixel values of first phase detection pixels on the basis of an actual input image corresponding to first normal pixels and the first phase detection pixels arranged in a first pattern; a second processing module suitable for calculating inverse gain values between the actual input image and the actual output image; and a third processing module suitable for generating a virtual input image on the basis of the actual output image and the inverse gain values, the virtual input image corresponding to second normal pixels and second phase detection pixels arranged in a second pattern different from the first pattern, wherein the first processing module is further suitable for generating a virtual output image obtained by correcting second phase detection pixel values of the second phase detection pixels on the basis of the virtual input image.

In accordance with an embodiment of the present disclosure, an image processing system may include: an image sensor including first normal pixels and first phase detection pixels arranged in a first pattern, and suitable for generating an actual input image corresponding to the first normal pixels and the first phase detection pixels; and an image processor suitable for generating an actual output image on the basis of the actual input image, generating a virtual input image having a second pattern different from the first pattern by using inverse gain values between the actual input image and the actual output image, and generating a virtual output image on the basis of the virtual input image.

In accordance with an embodiment of the present disclosure, a method of processing an image, the method may include: processing a first input image to generate a first output image, the first input image corresponding to a first pattern; generating a second input image based on the first output image and inverse gain values between the first input and output images, the second input image corresponding to a second pattern; and processing the second input image to generate a second output image.

BRIEF DESCRIPTION OF THE DRAWINGS

FIG. 3 is a diagram illustrating an example of a pixel array illustrated in FIG. 2 in accordance with an embodiment of the present disclosure.

FIGS. 6 to 10 are diagrams illustrating an operation of the image processing system illustrated in FIG. 1 in accordance with an embodiment of the present disclosure.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include or have the one or more other elements, unless otherwise mentioned. In the description throughout the specification, some components are described in singular forms, but the present disclosure is not limited thereto, and it will be understood that the components may be formed in plural.

Figure 1:
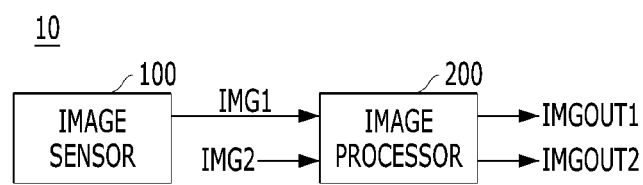
FIG. 1 is a block diagram illustrating an image processing system in accordance with an embodiment of the present disclosure.

FIG. 1 is a block diagram illustrating an image processing system 10 in accordance with an embodiment of the present disclosure.

Referring to FIG. 1, the image processing system 10 may include an image sensor 100 and an image processor 200.

The image sensor 100 may generate an actual input image IMG1 corresponding to first normal pixels R, G and B and first phase detection pixels LP and RP. The first normal pixels R, G and B and the first phase detection pixels LP and RP may be arranged in a first pattern (refer to FIG. 3).

The image processor 200 may generate an actual output image IMGOUT1 on the basis of the actual input image IMG1 corresponding to the first pattern, and generate a virtual output image IMGOUT2 on the basis of a virtual input image IMG2 corresponding to a second pattern different from the first pattern. The image processor 200 may generate the virtual input image IMG2 by using inverse gain values IGs based on the actual input image IMG1 and the actual output image IMGOUT1.

The image processor 200 may consider a pedestal when generating the virtual input image IMG2. For example, the image processor 200 may generate the virtual input image IMG2 in consideration of the pedestal by reflecting a code value, for example, 64, which corresponds to the pedestal, in each of the actual input image IMG1 and the actual output image IMGOUT1, calculating the inverse gain values IGs in which the code value is reflected, on the basis of the actual input image IMG1 in which the code value is reflected and the actual output image IMGOUT1 in which the code value is reflected, applying the inverse gain values IGs in which the code value is reflected to the actual output image IMGOUT1 in which the code value is reflected, and compensating for the code value ([{IMG1−64}/{IMGOUT1−64}] *{IMGOUT1−64}+64). Since the pedestal is a well-known art, detailed descriptions thereof are omitted.

Figure 2:
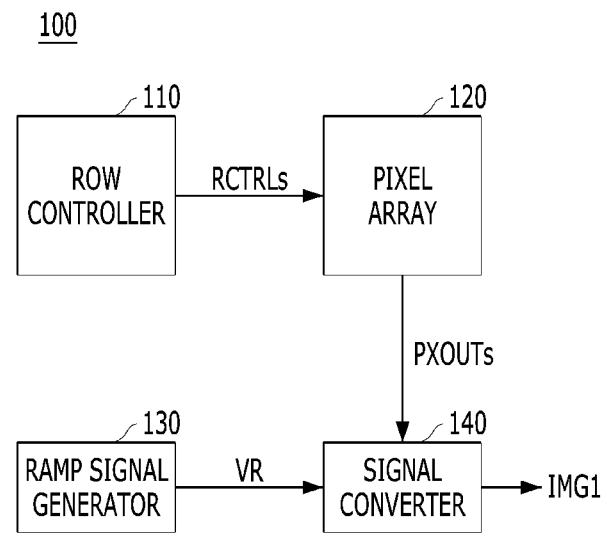
FIG. 2 is a block diagram illustrating an image sensor illustrated in FIG. 1 in accordance with an embodiment of the present disclosure.

FIG. 2 is a block diagram illustrating the image sensor 100 illustrated in FIG. 1 in accordance with an embodiment of the present disclosure.

Referring to FIG. 2, the image sensor 100 may include a row controller 110, a pixel array 120, a ramp signal generator 130 and a signal converter 140.

The row controller 110 may generate row control signals RCTRLs for controlling the pixel array 120 for each row. For example, the row controller 110 may generate first row control signals for controlling pixels arranged in a first row of the pixel array 120, and generate $y^{th}$ row control signals for controlling pixels arranged in a $y^{th}$ row of the pixel array 120, where "y" is a natural number equal to or greater than 2.

The pixel array 120 may include a plurality of pixels R, G, B, LP and RP arranged at intersections of a plurality of rows and a plurality of columns (refer to FIG. 3). The plurality of pixels R, G, B, LP and RP may output a plurality of pixel signals PXOUTs through a plurality of column lines for each row on the basis of the row control signals RCTRLs. For example, the pixels arranged in the first row among the plurality of pixels R, G, B, LP and RP may generate the pixel signals PXOUTs for a first unit row time on the basis of the first row control signals, and the pixels arranged in the $y^{th}$ row among the plurality of pixels R, G, B, LP and RP may generate the pixel signals PXOUTs for a $y^{th}$ unit row time on the basis of the $y^{th}$ row control signals.

The ramp signal generator 130 may generate a ramp signal VR for determining voltage levels of the pixel signals PXOUTs. For example, the ramp signal generator 130 may repeatedly generate the ramp signal VR that ramps in a predetermined pattern for each unit row time.

The signal converter 140 may generate the actual input image IMG1 on the basis of the ramp signal VR and the pixel signals PXOUTs.

FIG. 3 is a diagram illustrating an example of the pixel array 120 illustrated in FIG. 2 in accordance with an embodiment of the present disclosure.

Referring to FIG. 3, in the pixel array 120, first normal pixels R, G and B and first phase detection pixels LP and RP may be arranged in the first pattern. The first normal pixels R, G and B may be basically arranged in a quad pattern, and the first phase detection pixels LP and RP may be sparsely disposed in between the first normal pixels R, G and B. For example, the first phase detection pixels LP and RP may include a pair of pixels adjacent to each other. The phase detection pixel LP of the pair of pixels disposed on one side may have a first color filter, for example, B, and the phase detection pixel RP of the pair of pixels disposed on the other side may have a second color filter, for example, G. The present embodiment is not limited to the first pattern, and may be applied to various patterns, for example, a high dynamic range pattern, etc.

Figure 4:
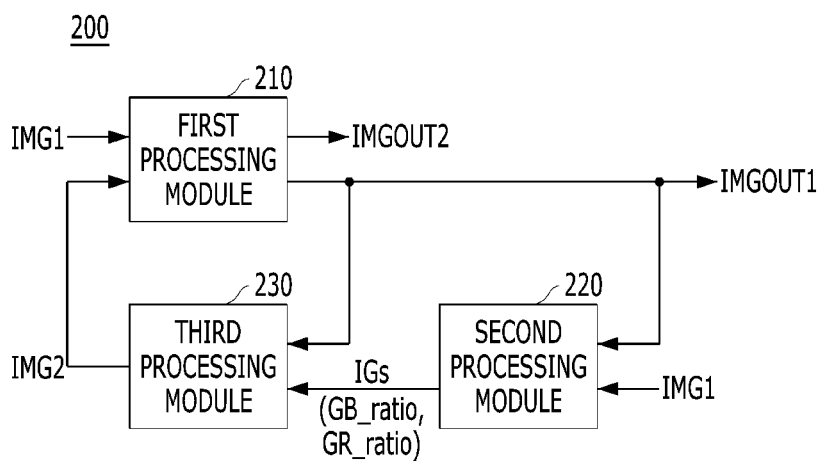
FIG. 4 is a block diagram illustrating an image processor illustrated in FIG. 1 in accordance with an embodiment of the present disclosure.

FIG. 4 is a block diagram illustrating the image processor 200 illustrated in FIG. 1 in accordance with an embodiment of the present disclosure.

Referring to FIG. 4, the image processor 200 may include a first processing module 210, a second processing module 220 and a third processing module 230.

The first processing module 210 may generate the actual output image IMGOUT1 on the basis of the actual input image IMG1. The actual output image IMGOUT1 may include first normal pixel values obtained by correcting the first normal pixels R, G and B and first phase detection pixel values obtained by correcting the first phase detection pixels LP and RP. The first processing module 210 may generate the virtual output image IMGOUT2 on the basis of the virtual input image IMG2. The virtual input image IMG2 may include second normal pixel values and second phase detection pixel values of second normal pixels R', G' and B' and second phase detection pixels LP' and RP' arranged in the second pattern. The virtual output image IMGOUT2 may include the second normal pixel values obtained by correcting the second normal pixels R', G' and B' and the second phase detection pixel values obtained by correcting the second phase detection pixels LP' and RP'.

The second processing module 220 may calculate the inverse gain values IGs between the actual input image IMG1 and the actual output image IMGOUT1 on the basis of the actual input image IMG1 and the actual output image IMGOUT1. The inverse gain values IGs may include first inverse gain values GB_ratio and second inverse gain values GR_ratio. The first inverse gain values GB_ratio may be calculated based on first peripheral pixel values of first peripheral pixels disposed on the periphery of the first phase detection pixels LP and RP among the first normal pixels R, G and B. For example, the first inverse gain values GB_ratio may be defined by Equation 1 below.

$$(IB\_ratio\text{-}PA\_input\_values/PX\_output\_values \qquad \text{[Equation 1]}$$

Herein, "PX_input_values" may be first input pixel values corresponding to the first peripheral pixel values among pixel values included in the actual input image IMG1, and "PX_output_values" may be first output pixel values corresponding to the first peripheral pixel values among pixel values included in the actual output image IMGOUT1.

That is, the first inverse gain values GB_ratio may be a ratio of the first input pixel values and the first output pixel values.

The second inverse gain values GR_ratio may be generated to be applied to pixels having a different condition from pixels to which the first inverse gain values GB_ratio are applied among the second phase detection pixels LP' and RP'. The second inverse gain values GR_ratio may be defined by Equation 2 below.

$$GR\_ratio = GB\_ratio * \alpha \quad \text{[Equation 2]}$$

Herein, "α" may be an offset value. The offset value may be a value set in consideration of wavelength characteristics of color filters of the second phase detection pixels LP' and RP'.

That is, the second inverse gain values GR_ratio may be calculated based on the first inverse gain values GB_ratio and the offset value.

The third processing module 230 may generate the virtual input image IMG2 on the basis of the actual output image IMGOUT1 and the inverse gain values IGs. For example, the third processing module 230 may generate the virtual input image IMG2 by applying the inverse gain values IGs to the actual output image IMGOUT1 according to the second pattern.

Figure 5:
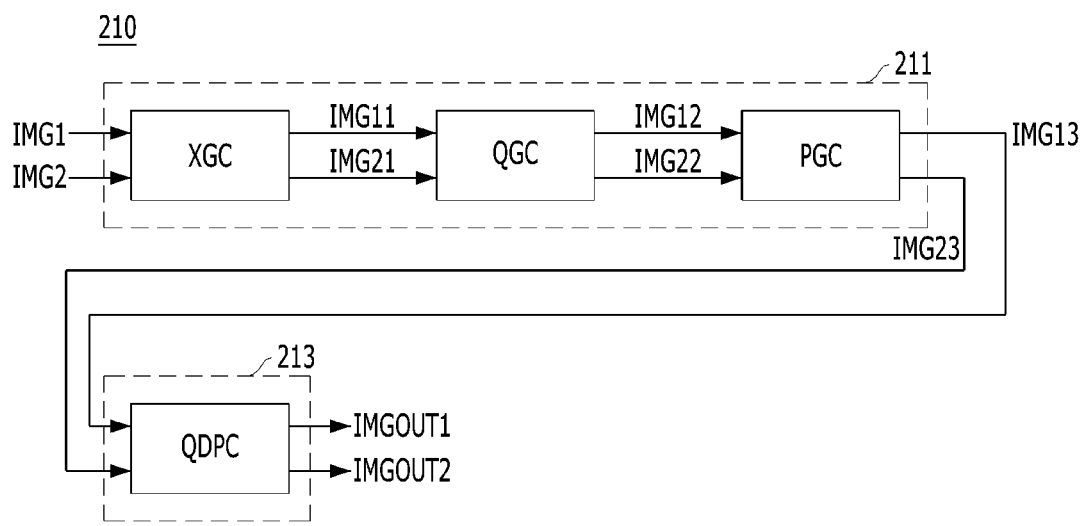
FIG. 5 is a block diagram illustrating a first processing module illustrated in FIG. 4 in accordance with an embodiment of the present disclosure.

FIG. 5 is a block diagram illustrating the first processing module 210 illustrated in FIG. 4 in accordance with an embodiment of the present disclosure.

Referring to FIG. 5, the first processing module 210 may include a first correction module 211 and a second correction module 213.

The first correction module 211 may primarily correct first phase detection pixel values of the first phase detection pixels LP and RP on the basis of an actual calibration gain related to the actual input image IMG1. The first correction module 211 may primarily correct second phase detection pixel values of the second phase detection pixels LP' and RP' on the basis of a virtual calibration gain related to the virtual input image IMG2.

The second correction module 213 may generate the actual output image IMGOUT1 by secondarily correcting the first phase detection pixel values on the basis of an actual dynamic gain related to the actual input image IMG1. The second correction module 213 may generate the virtual output image IMGOUT2 by secondarily correcting the second phase detection pixel values on the basis of a virtual dynamic gain related to the virtual input image IMG2.

For example, the first correction module 211 may include a first corrector XGC, a second corrector QGC and a third corrector PGC.

The first corrector XGC may correct the first peripheral pixel values of the first peripheral pixels disposed on the periphery of the first phase detection pixels LP and RP on the basis of the first normal pixel values of the first normal pixels R, G and B, and generate a first actual correction image IMG11 corresponding to the actual input image IMG1. Since each of the first peripheral pixel values includes a crosstalk component generated by the first phase detection pixels LP and RP, the first corrector XGC may compensate for the crosstalk component from the first peripheral pixel values. The first corrector XGC may correct second peripheral pixel values of second peripheral pixels disposed on the periphery of the second phase detection pixels LP' and RP' on the basis of the second normal pixel values of the second normal pixels R', G' and B', and generate a first virtual correction image IMG21 corresponding to the virtual input image IMG2.

The second corrector QGC may correct an imbalance between pixels having the same color filter among the first normal pixels R, G and B, on the basis of first correction pixel values included in the first actual correction image IMG11, and generate a second actual correction image IMG12 corresponding to the first actual correction image IMG11. The second corrector QGC may correct an imbalance between pixels having the same color filter among the second normal pixels R', G' and B', on the basis of second correction pixel values included in the first virtual correction image IMG21, and generate a second virtual correction image IMG22 corresponding to the first virtual correction image IMG21.

The third corrector PGC may correct the first phase detection pixel values on the basis of the actual calibration gain, and generate a third actual correction image IMG13 corresponding to the second actual correction image IMG12. The third corrector PGC may extract or calculate the actual calibration gain from the second actual correction image IMG12 or use the previously-stored actual calibration gain. The third corrector PGC may correct the second phase detection pixel values on the basis of the virtual calibration gain, and generate a third virtual correction image IMG23 corresponding to the second virtual correction image IMG22. The third corrector PGC may extract or calculate the virtual calibration gain from the second virtual correction image IMG22 or use the previously-stored virtual calibration gain.

The second correction module 213 may include a fourth corrector QDPC.

The fourth corrector QDPC may correct the first phase detection pixel values on the basis of the actual dynamic gain, and generate the actual output image IMGOUT1 corresponding to the third actual correction image IMG13. The fourth corrector QDPC may extract the actual dynamic gain from the third actual correction image IMG13. For example, the fourth corrector QDPC may calculate the actual dynamic gain, which is adaptively applicable, on the basis of third peripheral pixel values of third peripheral pixels included in a kernel preset centering around the first phase detection pixels LP and RP. The fourth corrector QDPC may correct the second phase detection pixel values on the basis of the virtual dynamic gain, and generate the virtual output image IMGOUT2 corresponding to the third virtual correction image IMG23. The fourth corrector QDPC may extract the virtual dynamic gain from the third virtual correction image IMG23. For example, the fourth corrector QDPC may calculate the virtual dynamic gain, which is adaptively applicable, on the basis of fourth peripheral pixel values of fourth peripheral pixels included in a kernel preset centering around the second phase detection pixels LP' and RP'.

Hereinafter, an operation of the image processing system 10 in accordance with an embodiment, which has the above-described configuration, is described.

The image sensor 100 may capture a bright background, that is, a white background, under a non-saturation condition, and generate the actual input image IMG1 corresponding to the bright background.

The image processor 200 may generate the actual output image IMGOUT1 on the basis of the actual input image IMG1 in a normal mode. The image processor 200 may generate the virtual output image IMGOUT2 on the basis of the virtual input image IMG2 in a verification mode. An operation of the image processor 200 is described with reference to FIGS. 6 to 10.

An operation of the image processor 200 according to the normal mode is described.

Figure 6:
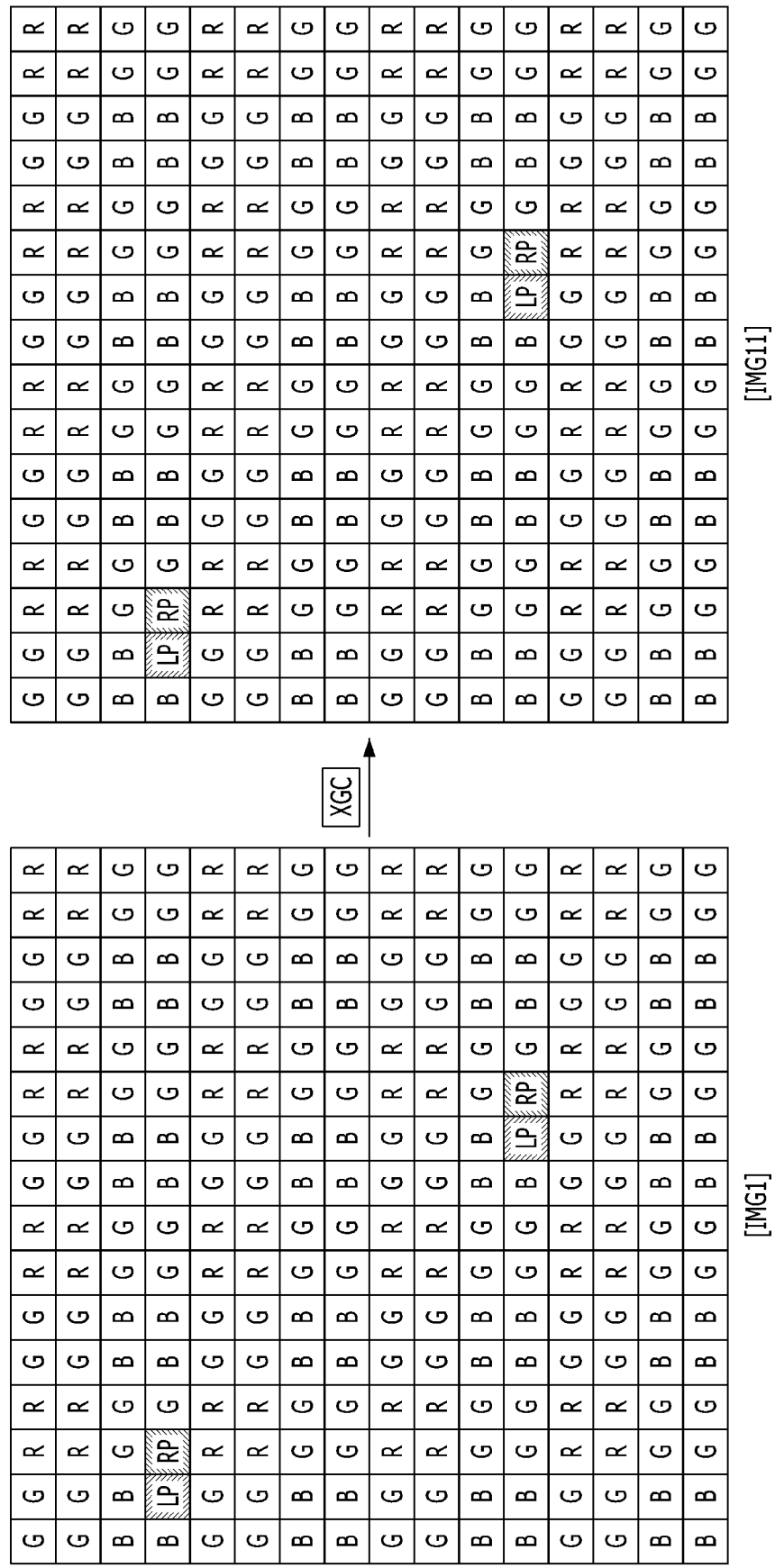

FIG. 6 is a diagram illustrating an operation of the first corrector XGC included in the image processor 200 in accordance with an embodiment of the present disclosure.

Referring to FIG. 6, the first corrector XGC may correct the first peripheral pixel values of the first peripheral pixels disposed on the periphery of the first phase detection pixels LP and RP, and generate the first actual correction image IMG11 corresponding to the actual input image IMG1. For example, the first peripheral pixels may include pixels included in a 6×5 kernel centering around the first phase detection pixels LP and RP. More precisely, the first peripheral pixels may include pixels included in a 5×5 kernel centering around one pixel LP of the first phase detection pixels LP and RP, and pixels included in a 5×5 kernel centering around the other pixel RP of the first phase detection pixels LP and RP. Since each of the first peripheral pixel values includes a crosstalk component generated by the first phase detection pixels LP and RP, the first corrector XGC may compensate for the crosstalk component from the first peripheral pixel values.

Figure 7:
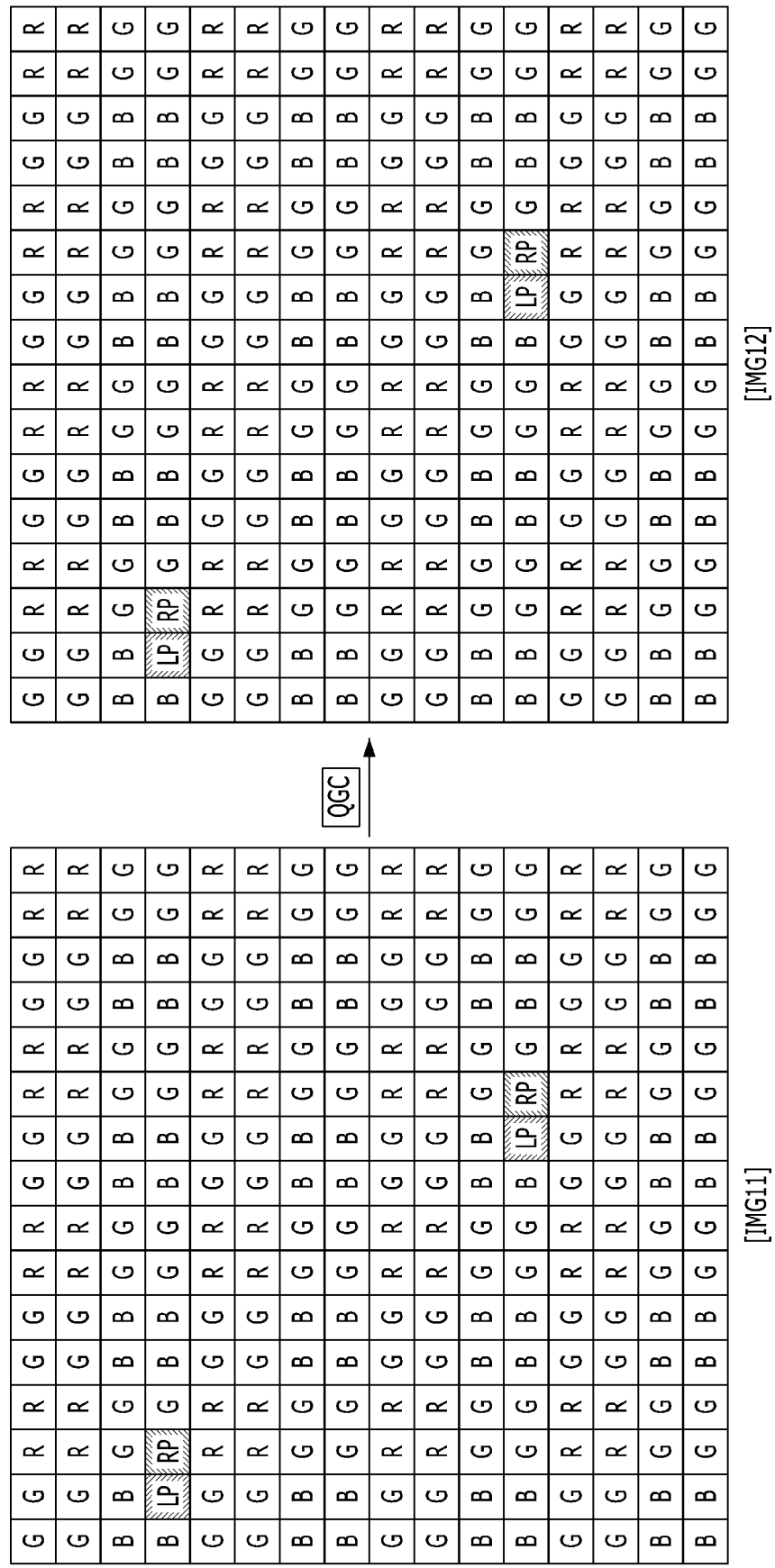

FIG. 7 is a diagram illustrating an operation of the second corrector QGC included in the image processor 200 in accordance with an embodiment of the present disclosure.

Referring to FIG. 7, the second corrector QGC may correct an imbalance between all of 2×2 pixels having the same color filter among the first normal pixels R, G and B, on the basis of the first correction pixel values included in the first actual correction image IMG11, and generate the second actual correction image IMG12 corresponding to the first actual correction image IMG11.

Figure 8:
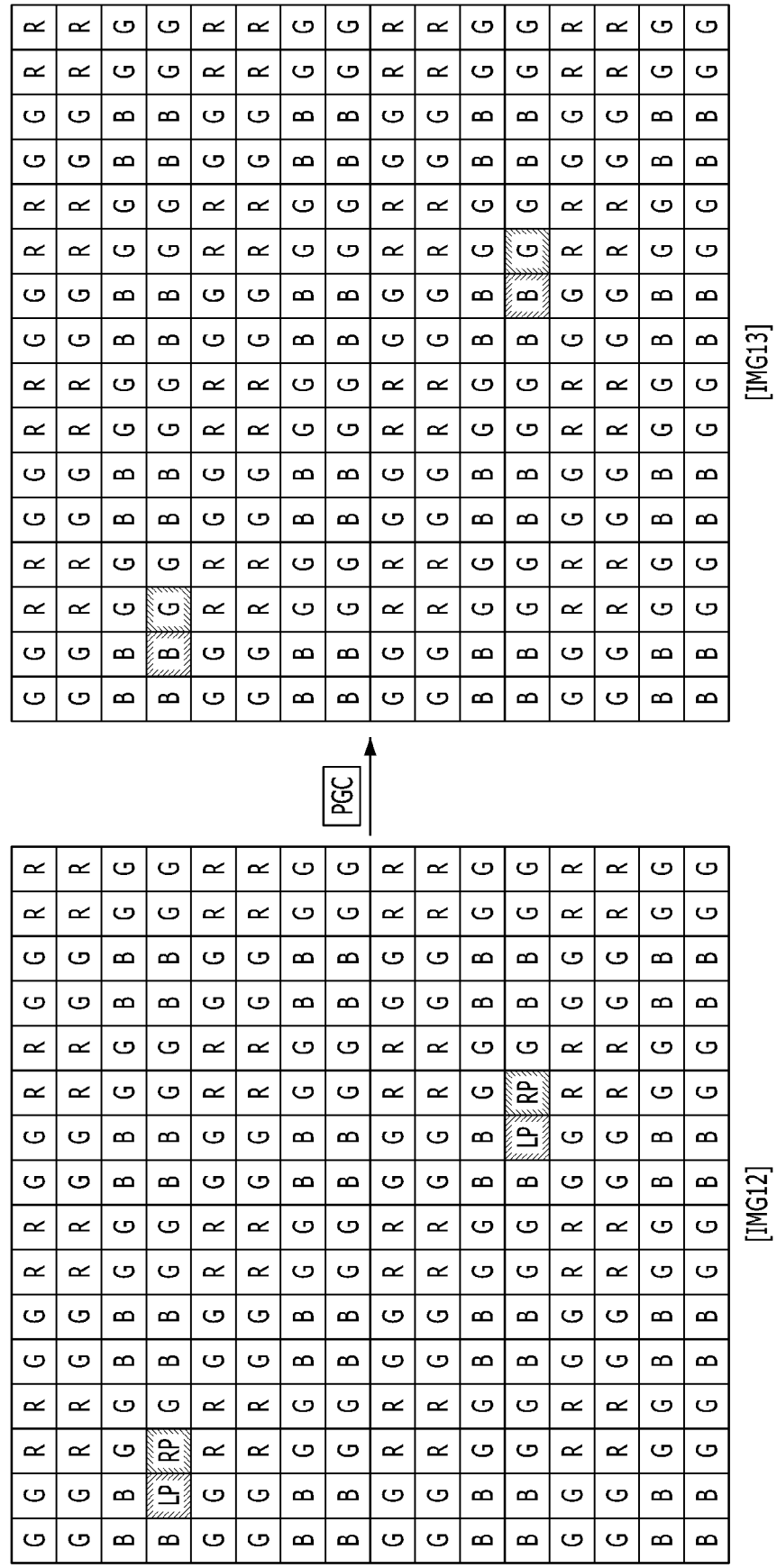

FIG. 8 is a diagram illustrating an operation of the third corrector PGC included in the image processor 200 in accordance with an embodiment of the present disclosure.

Referring to FIG. 8, the third corrector PGC may primarily correct the first phase detection pixel values on the basis of the actual calibration gain, and generate the third actual correction image IMG13 corresponding to the second actual correction image IMG12. For example, the third corrector PGC may generate the third actual correction image IMG13 by applying the actual calibration gain to the first phase detection pixel values. The actual calibration gain may be extracted, calculated or previously-stored by the third corrector PGC on the basis of pixel values included in the second actual correction image IMG12.

Figure 9:
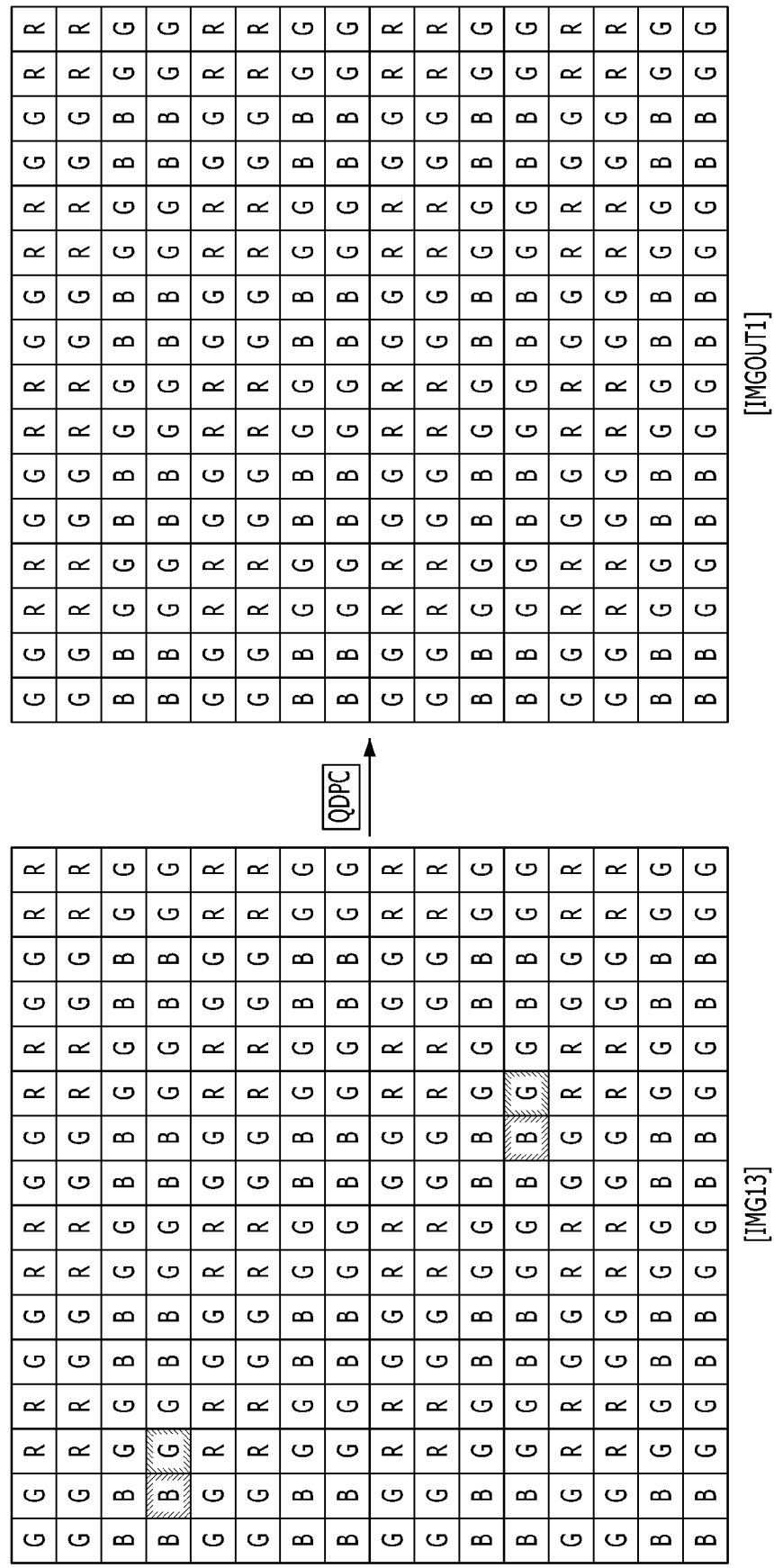

FIG. 9 is a diagram illustrating an operation of the fourth corrector QDPC included in the image processor 200 in accordance with an embodiment of the present disclosure.

Referring to FIG. 9, the fourth corrector QDPC may secondarily correct the first phase detection pixel values on the basis of the actual dynamic gain, and generate the first actual output image IMGOUT1 corresponding to the third actual correction image IMG13. The fourth corrector QDPC may extract the actual dynamic gain from the third actual correction image IMG13. For example, the fourth corrector QDPC may calculate the actual dynamic gain, which is adaptively applicable, on the basis of third peripheral pixel values of third peripheral pixels included in a kernel preset centering around the first phase detection pixels LP and RP.

An operation of the image processor 200 according to the verification mode is described.

The second processing module 220 may calculate the inverse gain values IGs between the actual input image IMG1 and the actual output image IMGOUT1 on the basis of the actual input image IMG1 and the actual output image IMGOUT1. The inverse gain values IGs may include the first inverse gain values GB_ratio and the second inverse gain values GR_ratio. The first inverse gain values GB_ratio may be calculated based on the first peripheral pixel values of the first peripheral pixels disposed around the first phase detection pixels LP and RP among the first normal pixels R, G and B. That is, the first inverse gain values GB_ratio may be a ratio of the first input pixel values and the second output pixel values. The second inverse gain values GR_ratio may be generated to be applied to pixels having a different condition from pixels to which the first inverse gain values GB_ratio are applied among the second phase detection pixels LP' and RP'. That is, the second inverse gain values GR_ratio may be calculated based on the first inverse gain values GB_ratio and the offset value.

The third processing module 230 may generate the virtual input image IMG2 on the basis of the actual output image IMGOUT1 and the inverse gain values IGs. For example, the third processing module 230 may generate the virtual input image IMG2 by applying the inverse gain values IGs to the actual output image IMGOUT1 according to the second pattern.

Figure 10:
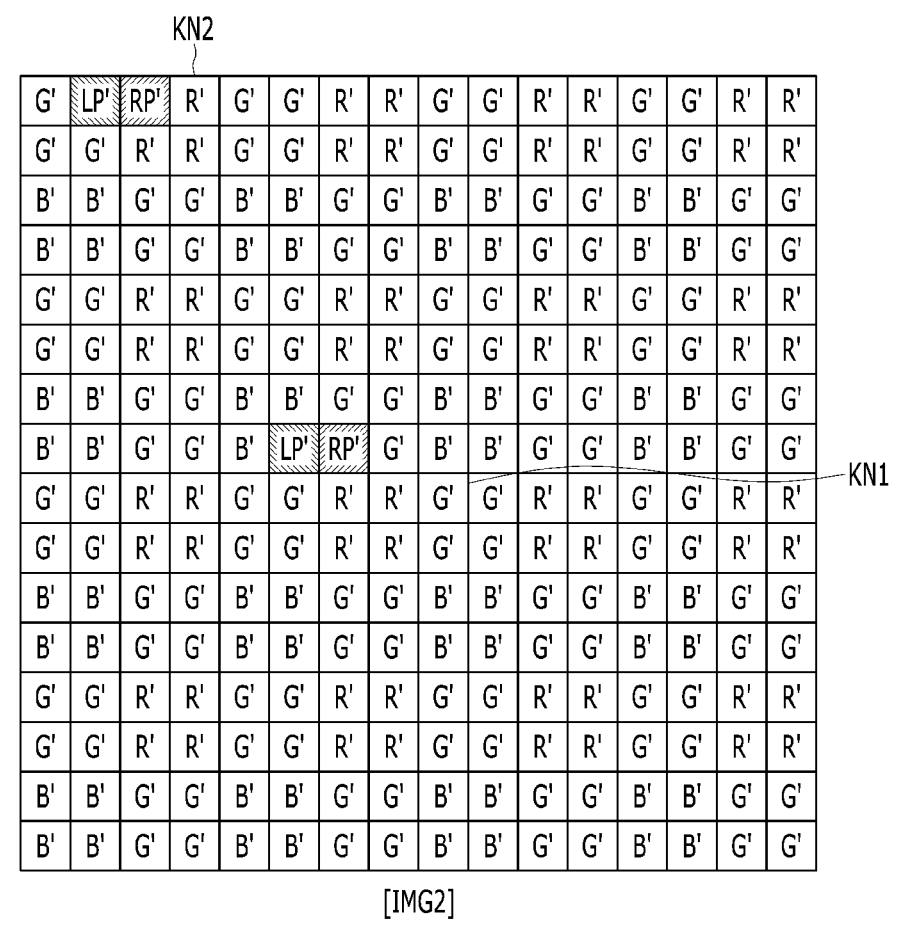

FIG. 10 is a diagram illustrating the virtual input image IMG2 in accordance with an embodiment of the present disclosure.

As illustrated in FIG. 10, the virtual input image IMG2 may correspond to the second pattern different from the first pattern of the actual input image IMG1. The second pattern may be set by a user. That is, the virtual input image IMG2 may correspond to the second normal pixels R', G' and B' and the second phase detection pixels LP' and RP' disposed at different positions from the first phase detection pixels LP and RP. The first inverse gain values GB_ratio may be applied to second peripheral pixels KN1 of the second phase detection pixels LP' and RP' having the same color filters as the first phase detection pixels LP and RP. The second inverse gain values GR_ratio may be applied to second peripheral pixels KN2 of the second phase detection pixels LP' and RP' having different color filters from the first phase detection pixels LP and RP.

Subsequently, the first corrector XGC may correct the second peripheral pixel values of the second peripheral pixels disposed on the periphery of the second phase detection pixels LP' and RP' on the basis of the second normal pixel values of the second normal pixels R', G' and B', and generate the first virtual correction image IMG21 corresponding to the virtual input image IMG2.

The second corrector QGC may correct an imbalance between all 2×2 pixels having the same color filter among the second normal pixels R', G' and B' on the basis of the second correction pixel values included in the first virtual correction image IMG21, and generate the 20) second virtual correction image IMG22 corresponding to the first virtual correction image IMG21.

The third corrector PGC may correct the second phase detection pixel values on the basis of the virtual calibration gain, and generate the third virtual correction image IMG23 corresponding to the second virtual correction image IMG22. For example, the third corrector PGC may generate the third virtual correction image IMG23 by applying the virtual calibration gain to the second phase detection pixel values. The virtual calibration gain may be extracted, calculated or previously-stored based on pixel values included in the second virtual correction image IMG22 by the third corrector PGC.

The fourth corrector QDPC may correct the second phase detection pixel values on the basis of the virtual dynamic gain, and generate the virtual output image IMGOUT2 corresponding to the third virtual correction image IMG23. The fourth corrector QDPC may extract the virtual dynamic gain from the third virtual correction image IMG23. For example, the fourth corrector QDPC may calculate the virtual dynamic gain, which is adaptively applicable, on the basis of fourth peripheral pixel values of fourth peripheral pixels included in a kernel preset centering around the second phase detection pixels LP' and RP'.

According to an embodiment of the present disclosure, it is possible to modify and verify an image signal processing (ISP) algorithm in advance on the basis of a virtual input image before an image sensor in which patterns, i.e., positions and/or densities, of phase detection pixels is changed, is manufactured.

According to an embodiment of the present disclosure, an image signal processing (ISP) algorithm may be modified and verified in advance on the basis of a virtual input image before an image sensor in which patterns, i.e., positions and/or densities, of phase detection pixels is changed, is manufactured, which makes it possible to reduce development time of an image processing system.

While the present disclosure has been illustrated and described with respect to specific embodiment, the disclosed embodiment is provided for description, and is not intended to be restrictive. Further, it is noted that the present disclosure may be achieved in various ways through substitution, change, and modification that fall within the scope of the following claims, as those skilled in the art will recognize in light of the present disclosure.

For example, in an embodiment of the present disclosure, when a pixel array has a high dynamic range pattern, an inverse gain value needs to be applied to each of a plurality of output images corresponding to a plurality of exposure times. Furthermore, the embodiments may be combined to form additional embodiments.

What is claimed is:

1. An image processor comprising:
a first processing module suitable for generating an actual output image obtained by correcting first phase detection pixel values of first phase detection pixels on the basis of an actual input image corresponding to first normal pixels and the first phase detection pixels arranged in a first pattern;
a second processing module suitable for calculating inverse gain values between the actual input image and the actual output image; and
a third processing module suitable for generating a virtual input image on the basis of the actual output image and the inverse gain values, the virtual input image corresponding to second normal pixels and second phase detection pixels arranged in a second pattern different from the first pattern,
wherein the first processing module is further suitable for generating a virtual output image obtained by correcting second phase detection pixel values of the second phase detection pixels on the basis of the virtual input image.

2. The image processor of claim 1, wherein:
the first phase detection pixels include at least one pair of pixels adjacent to each other,
the pair of pixels includes a first pixel having a first color filter and a second pixel having a second color filter, and
the second processing module calculates the inverse gain values on the basis of pixel values of peripheral pixels disposed on peripheries of the first and second pixels.

3. The image processor of claim 1, wherein:
the first phase detection pixels include at least one first pair of pixels adjacent to each other and at least one second pair of pixels adjacent to each other,
the first pair of pixels includes a first pixel having a first color filter and a second pixel having a second color filter,
the second pair of pixels includes a third pixel having a third color filter and a fourth pixel having the second color filter,
the inverse gain values include first inverse gain values and second inverse gain values,
the second processing module calculates the first inverse gain values on the basis of first pixel values of first peripheral pixels disposed on peripheries of the first and second pixels, and
the second processing module calculates the second inverse gain values on the basis of the first inverse gain values and an offset value.

4. The image processor of claim 1, wherein the second processing module calculates the inverse gain values on the basis of pixel values of peripheral pixels disposed on a periphery of the first phase detection pixels among the first normal pixels.

5. The image processor of claim 1, wherein the third processing module generates the virtual input image by applying the inverse gain values to the actual output image according to the second pattern.

6. The image processor of claim 1, wherein the first processing module includes:
a first correction module suitable for correcting the first phase detection pixel values on the basis of an actual calibration gain related to the actual input image, and correcting the second phase detection pixel values on the basis of a virtual calibration gain related to the virtual input image; and
a second correction module suitable for generating the actual output image by correcting the first phase detection pixel values on the basis of an actual dynamic gain related to the actual input image, and generating the virtual output image by correcting the second phase detection pixel values on the basis of a virtual dynamic gain related to the virtual input image.

7. The image processor of claim 6, wherein the first correction module includes:
a first corrector suitable for generating a first actual correction image corresponding to the actual input image by correcting pixel values of peripheral pixels disposed on the periphery of the first phase detection pixels on the basis of pixel values of the first normal pixels, and generating a first virtual correction image corresponding to the virtual input image by correcting pixel values of peripheral pixels disposed on the periphery of the second phase detection pixels on the basis of pixel values of the second normal pixels;
A second corrector suitable for generating a second actual correction image corresponding to the first actual correction image by correcting an imbalance between pixels having the same color filter among the first normal pixels on the basis of pixel values included in the first actual correction image, and generating a second virtual correction image corresponding to the first virtual correction image by correcting an imbalance between pixels having the same color filter among the second normal pixels on the basis of pixel values included in the first virtual correction image; and
a third corrector suitable for generating a third actual correction image corresponding to the second actual correction image by extracting the actual calibration gain from the second actual correction image and correcting the first phase detection pixel values on the basis of the actual calibration gain, and generating a third virtual correction image corresponding to the second virtual correction image by extracting the virtual calibration gain from the second virtual correction image and correcting the second phase detection pixel values on the basis of the virtual calibration gain.

8. The image processor of claim 6, wherein the second correction module generates the first actual output image corresponding to the third actual correction image by extracting the actual dynamic gain from the third actual correction image and correcting the first phase detection pixel values on the basis of the Actual dynamic gain, and generates the virtual output image corresponding to the third virtual correction image by extracting the virtual dynamic gain from the third virtual correction image and correcting the second phase detection pixel values on the basis of the virtual dynamic gain.

9. An image processing system comprising:
an image sensor including first normal pixels and first phase detection pixels arranged in a first pattern, and suitable for generating an actual input image corresponding to the first normal pixels and the first phase detection pixels; and
an image processor suitable for generating an actual output image on the basis of the actual input image, generating a virtual input image having a second pattern different from the first pattern by using inverse gain values between the actual input image and the actual output image, and generating a virtual output image on the basis of the virtual input image.

10. The image processing system of claim 9, wherein:
the first phase detection pixels include at least one pair of pixels adjacent to each other,
the pair of pixels includes a first pixel having a first color filter and a second pixel having a second color filter, and
the image processor calculates the inverse gain values on the basis of pixel values of peripheral pixels disposed on peripheries of the first and second pixels.

11. The image processing system of claim 9, wherein:
the first phase detection pixels include at least one first pair of pixels adjacent to each other and at least one second pair of pixels adjacent to each other,
the first pair of pixels includes a first pixel having a first color filter and a second pixel having a second color filter,
the second pair of pixels includes a third pixel having a third color filter and a fourth pixel having the second color filter,
the inverse gain values include first inverse gain values and second inverse gain values,
the image processor calculates the first inverse gain values on the basis of first pixel values of first peripheral pixels disposed on peripheries of the first and second pixels, and
the image processor calculates the second inverse gain values on the basis of the first inverse gain values and an offset value.

12. The image processing system of claim 9,
wherein the image processor includes:
a first processing module suitable for generating the actual output image obtained by correcting first phase detection pixel values of the first phase detection pixels on the basis of the actual input image;
a second processing module suitable for calculating the inverse gain values on the basis of the actual input image and the actual output image; and
a third processing module suitable for generating the virtual input image on the basis of the actual output image and the inverse gain values, the virtual input image corresponding to second normal pixels and second phase detection pixels arranged in the second pattern, and
wherein the first processing module is further suitable for generating the virtual output image obtained by correcting second phase detection pixel values of the second phase detection pixels on the basis of the virtual input image.

13. The image processing system of claim 12, wherein the second processing module calculates the inverse gain values on the basis of pixel values of peripheral pixels disposed on a periphery of the first phase detection pixels among the first normal pixels.

14. The image processing system of claim 12, wherein the third processing module generates the virtual input image by applying the inverse gain values to the actual output image according to the second pattern.

15. The image processing system of claim 12, wherein the first processing module includes:
a first correction module suitable for correcting the first phase detection pixel values on the basis of an actual calibration gain related to the actual input image, and correcting the second phase detection pixel values on the basis of a virtual calibration gain related to the virtual input image; and
a second correction module suitable for generating the actual output image by correcting the first phase detection pixel values on the basis of an actual dynamic gain related to the actual input image, and generating the virtual output image by correcting the second phase detection pixel values on the basis of a virtual dynamic gain related to the virtual input image.

16. The image processing system of claim 15, wherein the first correction module includes:
a first corrector suitable for generating a first actual correction image corresponding to the actual input image by correcting pixel values of peripheral pixels disposed on the periphery of the first phase detection pixels on the basis of pixel values of the first normal pixels, and generating a first virtual correction image corresponding to the virtual input image by correcting pixel values of peripheral pixels disposed on the periphery of the second phase detection pixels on the basis of pixel values of the second normal pixels;
a second corrector suitable for generating a second actual correction image corresponding to the first actual correction image by correcting an imbalance between pixels having the same color filter among the first normal pixels on the basis of pixel values included in the first actual correction image, and generating a second virtual correction image corresponding to the first virtual correction image by correcting an imbalance between pixels having the same color filter among the second normal pixels on the basis of pixel values included in the first virtual correction image; and
a third corrector suitable for generating a third actual Correction image corresponding to the second actual correction image by extracting the actual calibration gain from the second actual correction image and correcting the first phase detection pixel values on the basis of the actual calibration gain, and generating a third virtual correction image corresponding to the second virtual correction image by extracting the virtual calibration gain from the second virtual correction image and correcting the second phase detection pixel values on the basis of the virtual calibration gain.

17. The image processing system of claim 15, wherein the second correction module generates the first actual output image corresponding to the third actual correction image by extracting the actual dynamic gain from the third actual correction image and correcting the first phase detection pixel values on the basis of the actual dynamic gain, and generates the virtual output image corresponding to the third virtual correction image by extracting the virtual dynamic gain from the third virtual correction image and correcting the second phase detection pixel values on the basis of the virtual dynamic gain.

18. A method of processing an image, the method comprising:

processing a first input image to generate a first output image, the first input image corresponding to a first pattern;

generating a second input image based on the first output image and inverse gain values between the first input and output images, the second input image corresponding to a second pattern; and processing the second input image to generate a second output image.

19. The method of claim 18, wherein the inverse gain values are calculated on the basis of pixel values of peripheral pixels disposed on a periphery of phase detection pixels among normal pixels included a pixel array.

20. The method of claim 18, wherein the second input image is generated by applying the inverse gain values to the first output image according to the second pattern.

* * * * *